March 4, 1941.  J. M. SCHMIED  2,233,902
SPLIT OIL SEAL
Filed Jan. 28, 1939
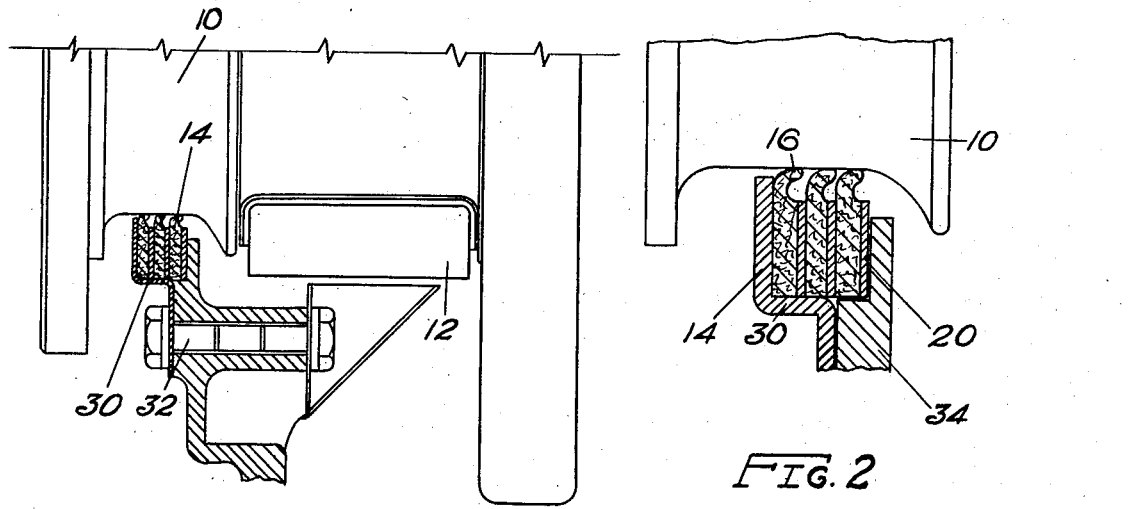
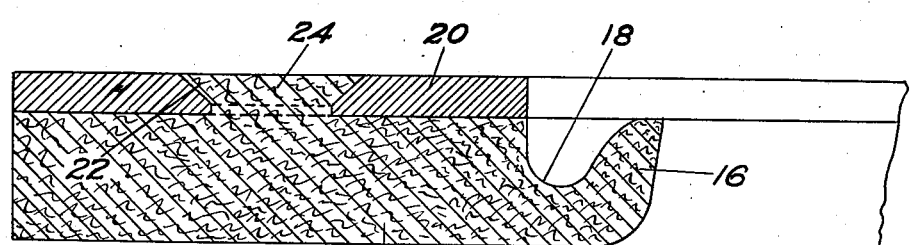
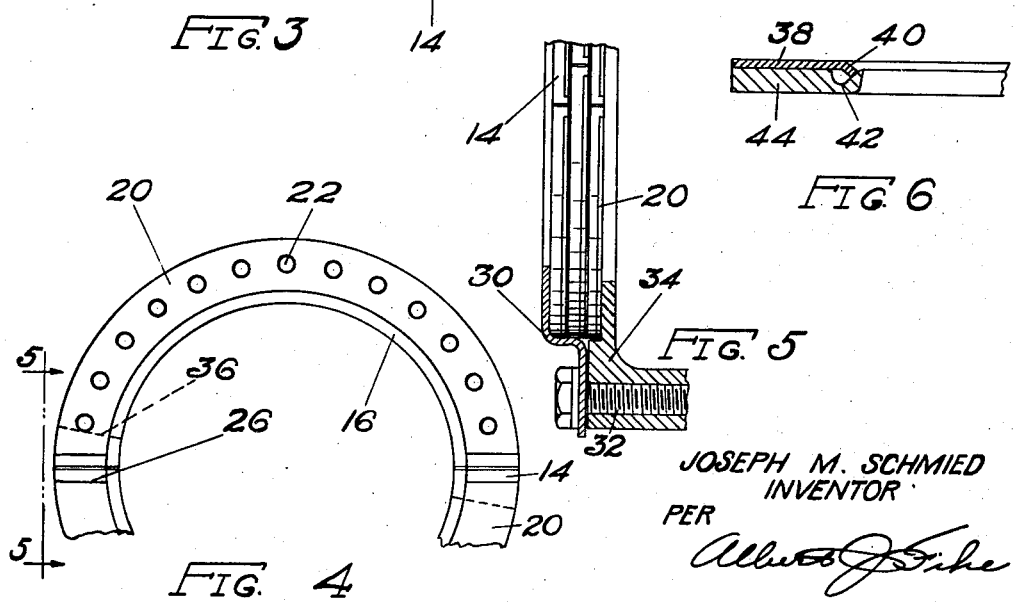
JOSEPH M. SCHMIED
INVENTOR
PER
ATTORNEY Patented Mar. 4, 1941

2,233,902

UNITED STATES PATENT OFFICE 2,233,902

SPLIT OIL SEAL

Joseph M. Schmied, Chicago, Ill., assignor to Victor Manufacturing & Gasket Company, Chicago, Ill., a corporation of Illinois Application January 28, 1939, Serial No. 253,329

1 Claim. (Cl. 286—5)

This invention relates to an improved split oil seal, and has, for one of its principal objects, the provision of a fluid seal, particularly for oils and other lubricants which can be applied about a rotating shaft such as an axle or the end of a crank-shaft of an automobile, and which, when so applied, will form an effective seal against loss of lubricant on the one hand and the increase of dust and foreign particles on the other hand.

One of the important objects of this invention is to provide an oil seal or the like which is so constructed that it can be assembled in position about a shaft or axle even when the shaft has already been installed or when said shaft or axle has shoulders or other elements therein which render the sliding application of an annular fluid seal impractical, or out of the question.

Another and further important object of the invention is to provide, in an oil seal, a plurality of parts which are interchangeable and which can be readily assembled about a shaft in sealing relationship therewith and which, when so assembled, will be positively retained in operative relationship for a practically indefinite length of time.

Another and still further important object of the invention is to provide, in an oil seal, a plurality of prefabricated parts, each of which comprises a semi-circular element adapted to be applied to a shaft and which has a semi-circular counterpart adapted to be applied to the other face of the shaft, and, at the same time, one or more of these pairs of semi-circular elements will be staggered with regard to the others so that a more effective sealing operation will result.

Still another and further important object of the invention is the provision of a novel holder or retaining element for the assembled fluid seal of this invention.

Other and further important objects of the invention will be apparent from the disclosures in the accompanying drawing and following specification.

The invention, in a preferred form, is shown in the drawing and hereinafter more fully described.

In the drawing:
Figure 1 is a detail view, partly in section, of a rotatable shaft with the improved split oil seal of this invention applied thereto.

Figure 2 is an enlarged view showing, in more detail, the oil seal and structure itself.
Figure 3 is a still further enlargement illustrating the end of one of the elements of the oil sealing structure.

Figure 4 is an elevation of the assembled sealing structure, parts being broken away and other parts being shown in dotted lines to indicate the staggered relationship of the parts.

Figure 5 is a side view of the structure of Figure 4, looking at the same from the line 5—5 of Figure 4 and also including details of the clamping and supporting structure.

Figure 6 is a detail sectional view, illustrating a slight modification of the invention.

As shown in the drawing:

The reference numeral 10 indicates generally a shaft such as, for example, the crank-shaft of an automobile or other internal combustion engine, the same being supported in bearings 12 and having the improved oil seal of this invention applied thereto.

The oil seal itself comprises a plurality of flexible sealing elements 14, each preferably composed of some composition such as synthetic rubber and having a lip portion 16 (Figure 5) defined by an annular groove or cut 18, and this synthetic rubber sealing element is mounted on and supported by a metallic washer 20 to which it is securely fastened, preferably during the vulcanizing operation. The washer 20 has openings 22 therein into which portions 24 of the synthetic rubber are extruded during the molding and vulcanizing operation, thereby providing a close contacting relationship between the parts and preventing any possibility of the sealing element proper ever becoming loose from the metallic washer.

As will be best noted from Figure 4, each of the metallic washers 20 is approximately in the form of a semi-circle, preferably being fore-shortened at each end as indicated at 26, thereby providing a slight extending portion of the flexible sealing element which completes the semi-circle.

As best shown in Figures 1, 2, and 5, the semi-circular sections 14—20 are assembled into a circular relationship about the shaft 10 and securely clamped in position there-about by means of a supporting structure which comprises an outer plate 30 somewhat Z-shaped in cross-section, this being affixed by means of bolts 32 to an inner support 34, the bolts being securely tightened so as to retain the parts in proper cooperative relationship.

From an inspection of Figures 4 and 5, it will be noted that the inner semi-circular sections are staggered with relation to the outer assembled pairs of sections, this best indicated by the dotted lines 36 in Figure 4 and also from the end view which comprises Figure 3. This staggering of the assembly acts to positively prevent any possible leakage of oil or other fluid through the joints which are formed when the pairs of semi-circular sections are assembled in the holders 30—34.

Obviously, some compression of the parts takes place when the device is assembled into position, this also enhancing the sealing action, this compression being both lateral on account of the action of the bolts 32 and also vertically or diametrically on account of the structural relationship of the parts 30—34 and their positioning with regard to the shaft 10.

In Figure 6, the metal washer 38 is slightly wider than the washers 20, and has its inner periphery bent downwardly as shown at 40 into the groove 42 in the flexible sealing element 44. The dimension of this downwardly turned edge is such that a reinforcement for the sealing lip of the element 44 is provided, while, at the same time, binding against the shaft is prevented. This provides a more rugged construction for heavy work.

It will be seen that herein is provided a split seal which can be readily applied about a shaft which has a shoulder thereon, and which can also be installed after a motor or other similar mechanical structure has been assembled, while, at the same time, an adequate sealing relationship will result. Furthermore, the parts themselves are readily constructed in quantities for production and quite economically, while, at the same time, great numbers of standard sizes can be readily made up, thereby cutting expense.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A split oil seal adapted for application to a shaft, comprising a plurality of semi-circular portions, each portion including a flat metallic half washer, and a flat semi-circular flexible sealing element attached thereto, the flexible portion of each section being of a radial width slightly greater than the corresponding width of the metallic half washer, said additional width including a flexible lip portion outlined by an annular groove, the outermost edge of the annular groove coinciding with the inner edge of the metallic washer, the metallic half washer being fore-shortened at its cut radial ends, and means for fastening said portions together about a shaft while, at the same time, compressing the flexible elements whereby the metallic half washers contact each other.

JOSEPH M. SCHMIED.